United States Patent
Oshima

(10) Patent No.: US 8,191,595 B2
(45) Date of Patent: Jun. 5, 2012

(54) TIRE FOR TWO-WHEELED MOTORCYCLES INCLUDING INTERMEDIATE CARCASS LAYER

(75) Inventor: Masatomo Oshima, Kodaira (JP)

(73) Assignee: Bridgestone Corporation, Tokyo (JP)

(*) Notice: Subject to any disclaimer, the term of this patent is extended or adjusted under 35 U.S.C. 154(b) by 798 days.

(21) Appl. No.: 12/278,923

(22) PCT Filed: Jan. 31, 2007

(86) PCT No.: PCT/JP2007/051559
§ 371 (c)(1),
(2), (4) Date: Sep. 18, 2008

(87) PCT Pub. No.: WO2007/091460
PCT Pub. Date: Aug. 16, 2007

(65) Prior Publication Data
US 2010/0163149 A1    Jul. 1, 2010

(30) Foreign Application Priority Data
Feb. 10, 2006 (JP) .................. P2006-034389

(51) Int. Cl.
*B60C 3/00* (2006.01)
*B60C 9/08* (2006.01)
*B60C 9/22* (2006.01)
*B60C 9/28* (2006.01)
*B60C 13/00* (2006.01)

(52) U.S. Cl. ........ 152/454; 152/531; 152/533; 152/538; 152/550; 152/555; 152/560; 152/DIG. 19

(58) Field of Classification Search .......... 152/560–561, 152/550, DIG. 19, 555, 538, 531, 533, 454
See application file for complete search history.

(56) References Cited

U.S. PATENT DOCUMENTS

| 2,939,503 A | * | 6/1960 | Harris et al. |
| 3,730,246 A | * | 5/1973 | Sidles et al. ........... 152/DIG. 19 |
| 2004/0250938 A1 | * | 12/2004 | Matsunami ............... 152/550 X |

FOREIGN PATENT DOCUMENTS

| JP | 63170103 A | * | 7/1988 |
| JP | 63-305007 | | 12/1988 |
| JP | 01-229703 | | 9/1989 |
| JP | 06-001105 | | 1/1994 |
| JP | 08-216619 A | | 8/1996 |
| JP | 10-244816 | | 9/1998 |
| JP | 2000-177313 A | | 6/2000 |
| JP | 2003-320812 A | | 11/2003 |
| JP | 2005-254993 A | | 9/2005 |
| JP | 2005-255060 A | | 9/2005 |
| WO | 2004/085173 A1 | | 10/2004 |

OTHER PUBLICATIONS

English machine translation of JP 8-216619 A, Aug. 27, 1996.*
English machine translation of Japanese Patent Application 10-244816 A, Sep. 14, 1998.*
Supplementary European Search Report dated Mar. 25, 2010 (6 pages).
International Search Report mailed May 1, 2007, in PCT/JP2007/051559, English and Japanese, 5 pages.

* cited by examiner

*Primary Examiner* — Adrienne C Johnstone
(74) *Attorney, Agent, or Firm* — Sughrue Mion, PLLC

(57) ABSTRACT

A tire for two-wheeled motorcycles of the present invention includes a first carcass layer folded back along circumferential surfaces of bead cores, a second carcass layer folded back along circumferential surfaces of turnbacks of the first carcass layer 5, a belt layer wound spirally along a tire circumferential direction and an intermediate carcass layer provided between the first and second carcass layers 7 and in an inner circumferential side of the belt layer and extending close to a tire maximum width.

6 Claims, 4 Drawing Sheets

COMPARATIVE ART

COMPARATIVE ART ated with intermediate carcass layer text follows.

TIRE FOR TWO-WHEELED MOTORCYCLES INCLUDING INTERMEDIATE CARCASS LAYER

TECHNICAL FIELD

The present inventions relate to a tire for two-wheeled motorcycles, especially relates to a tire for two-wheeled motorcycles including at least a first carcass layer and a second carcass layer.

BACKGROUND ART

Heretofore, various proposals have been made for a pneumatic tire equipped on two-wheeled motorcycles (hereinafter, a tire for two-wheeled motorcycles). For example, a tire for two-wheeled motorcycles was disclosed, in which a belt layer is provided outside a carcass layer and a supplemental belt layer is further provided to support the outside belt layer (see Patent Documents 1 to 4). In such a tire for two-wheeled motorcycles, driveability and stability can be made improved by improving tread stiffness.

Patent Document 1: Japanese Patent Application Laid-Open NO. S63-305007
Patent Document 2: Japanese Patent Application Laid-Open NO. H1-229703
Patent Document 3: Japanese Patent Application Laid-Open NO. H6-1105
Patent Document 4: Japanese Patent Application Laid-Open NO. H10-244816

DISCLOSURE OF THE INVENTION

However, since the belt layer and the supplemental belt layer are layered outside the carcass layer in the above-mentioned tire for two-wheeled motorcycles, reduced is shear stiffness (so-called shear strength) against a lateral force applied from a road surface to a tread surface. Therefore, although tire stiffness (tread stiffness) can be improved, the shear stiffness against a lateral force is reduced and thereby driveability and stability, especially handling response, cannot be improved.

Consequently, it is an object of the present inventions to provide a tire for two-wheeled motorcycles that can prevent reduction of shear stiffness and also can improve driveability and stability, especially handling response.

A tire for two-wheeled motorcycles according to the present invention includes a first carcass layer, a second carcass layer, a belt layer and an intermediate carcass layer. The first carcass layer is folded back along circumferential surfaces of bead cores. The second carcass layer is folded back along circumferential surfaces of turnbacks of the first carcass layer. The belt layer is provided in an outer circumferential side of the first carcass layer and the second carcass layer and spirally wound along a tire circumferential direction. The intermediate carcass layer is provided between the first carcass layer and the second carcass layer and in an inner circumferential side of a tread and extends close to a tire maximum width position.

Here, "close to a tire maximum width position" means within a ±20 mm range in the tire radial direction from a line parallel to the rotation axis of the tire which passes through the tire maximum width position.

According to this configuration, shear stiffness against a lateral or back-and forth input can be ensured by the intermediate carcass layer provided between the first carcass layer and the second carcass layer and also in the inner circumferential side of the tread without reducing shear stiffness (so-called shear strength) against a lateral input from a road surface to a tread surface. As a result, driveability and stability, especially handling response, can be improved.

Here, it is preferable that the number of cords per unit width of the intermediate cords is smaller than the number of cords per unit width of the first and second cords. If the number of cords per unit width of the intermediate cords is larger than the number of cords per unit width of the first and second cords, driveability and stability, and handling response may be reduced due to inhibition of force applying from a road surface to a tread surface.

Here, it is preferable that a skew angle of intermediate cords composing the intermediate carcass layer is almost 90 degrees to the tire circumferential direction. Here, "almost 90 degrees" includes a ±5 degrees angle range to the tire circumferential direction.

Here, it is preferable that the number of cords per unit width of the intermediate cords is smaller than the number of cords per unit width of and second cords. If the number of cords per unit width of the intermediate cords is larger than the number of cords per unit width of the first and second cords, driveability and stability, and handling response may be reduced due to inhibition of force applying from a road surface to a tread surface.

Here, it is preferable that thickness of the intermediate carcass layer is smaller than thickness of the first carcass layer and than thickness of the second carcass layer. If the thickness of the intermediate carcass layer is larger than the thickness of the first and second carcass layers, driveability and stability, and handling response may be reduced due to inhibition of force applying from a road surface to a tread surface.

Here, it is preferable that the skew angle of the first cords and the skew angle of the second cords are opposite.

BEST MODE(S) FOR CARRYING OUT THE INVENTION

One embodiment of a tire for two-wheeled motorcycles according to the present invention will be explained with reference to diagrams. Note that, in respect to descriptions on the drawings, each equivalent or corresponding configuration is allocated to an equivalent or corresponding numeral. However, the drawings are shown in outline, and thereby each actual proportion of dimension or the like may be different from an actual one. Therefore, each concrete dimension or the like should be determined with considering explanations below. In addition, each relation or proportion of dimension may be different between the drawings.

Figure 1:
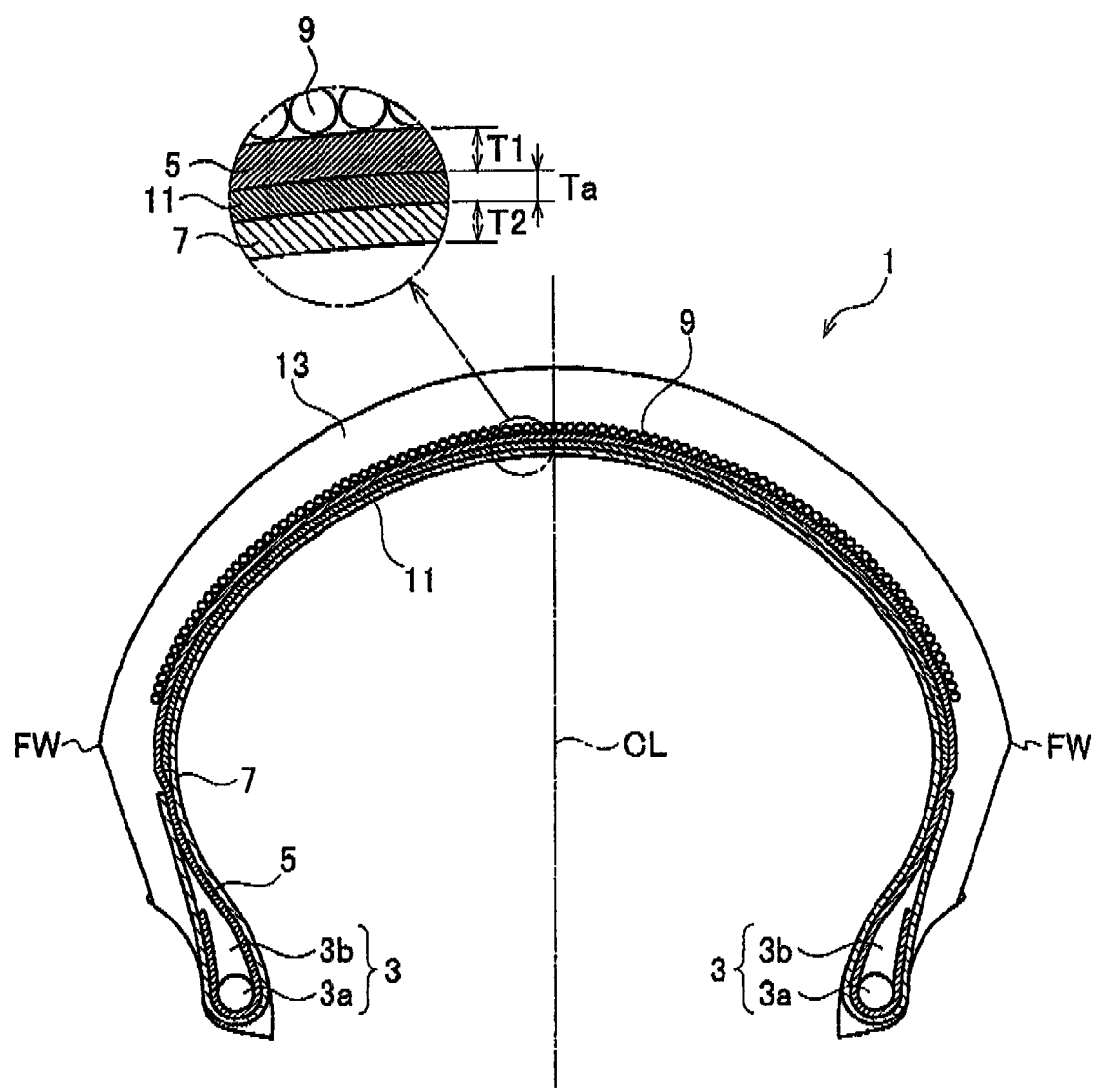
FIG. 1 is a cross sectional diagram along a tread width direction showing a tire for two-wheeled motorcycles according to a present embodiment.
Figure 2:
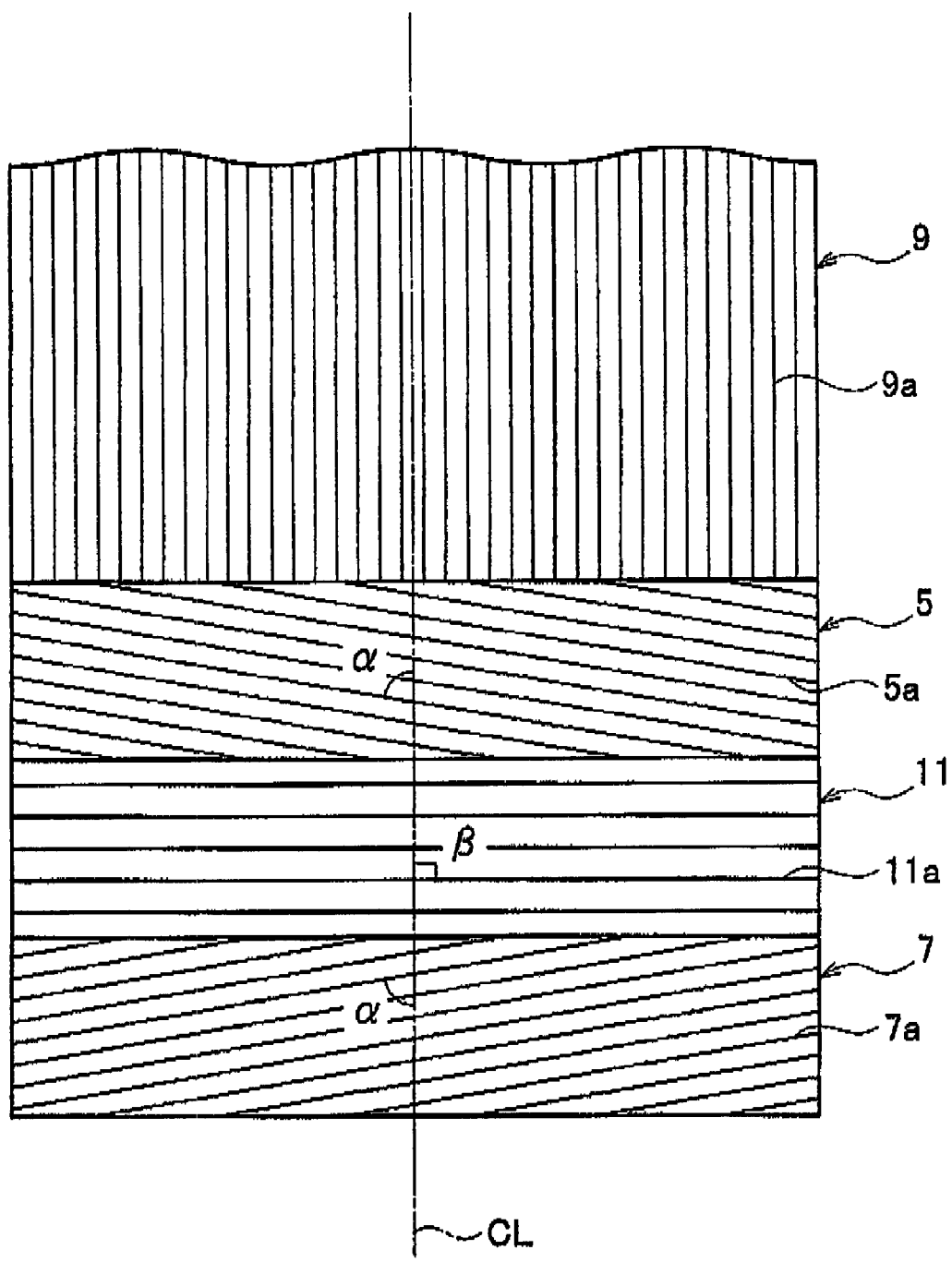
FIG. 2 is a plan view diagram showing carcass layers, a carcass intermediate layer and a belt layer that configure the tire for two-wheeled motorcycles according to the present embodiment.

FIG. 1 is a cross sectional diagram along a tread width direction showing the tire for two-wheeled motorcycles according to the present embodiment. FIG. 2 is a plan view diagram showing carcass layers, a carcass intermediate layer and a belt layer that configure the tire for two-wheeled motorcycles according to the present embodiment.

As shown in FIG. 1, the tire 1 for two-wheeled motorcycles includes a pair of beads 3 each of which includes a bead core 3a and a bead filler 3b that contact with a wheel rim (not shown).

In addition, the tire 1 includes a first carcass layer 5 that is folded back from insides toward outsides in the tread width direction along circumferential surfaces of the bead cores 3a. Further, the tire 1 includes a second carcass layer 7 that is folded back from insides toward outsides in the tread width direction along circumferential surfaces of turnbacks of the first carcass layer 5.

A belt layer 9 that is spirally wound along a tire circumferential direction is provided in the outer circumferential side of the first carcass layer 5 and the second carcass layer 7. In addition, a tread 13 that contacts with a road surface is provided in the outer circumferential side of the belt layer 9.

An intermediate carcass layer 11 that extends close to a tire maximum width position is provided between the first carcass layer 5 and the second carcass layer 7. Note that the intermediate carcass layer 11 is positioned in an inner circumferential side of the tread 13. Specifically, each edge of the intermediate carcass layer 11 is within a ±20 mm range from tire maximum width points FW (so-called a case line). The intermediate carcass layer 11 reinforces stiffness of the first carcass layer 5 and the second carcass layer 7. In addition, the thickness (Ta) of the intermediate carcass layer 11 is smaller than the thickness (T1) of the first carcass layer 5 or the thickness (T2) of the second carcass layer 7.

Specifically, as shown in FIG. 1, the edges of the tread 13 are located at tire maximum width points FW, the belt layer 9 extends from the tire equatorial plane CL to terminate at each edge position located at a radial distance from the rotation axis of the tire which is greater than the radial distance from the rotation axis of the tire of a line parallel to the rotation axis of the tire and passing through the tire maximum width points FW, and the intermediate carcass layer 11 extends from the tire equatorial plane CL to terminate at each edge position located at a radial distance from the rotation axis of the tire which is less by as much as 20 mm than the radial distance from the rotation axis of the tire of a line parallel to the rotation axis of the tire and passing through the tire maximum width points FW.

Here, as shown in FIG. 2, 70 to 85 degrees is a skew angle ($\alpha$) of first cords 5a composing the first carcass layer 5 and second cords 7a of the second carcass layer 7 to the tire circumferential direction. The first cords 5a are counter-skewed to the second cords in order to ensure stiffness of the tire 1 (stiffness of the tread 13).

Note that, if the skew angle ($\alpha$) to the tire circumferential direction is smaller than 70 degrees, lateral stiffness against a lateral input (a lateral direction on paper in FIG. 2) from a road surface to a tread surface may become too high. On the other hand, if the skew angle ($\alpha$) to the tire circumferential direction is larger than 85 degrees, shear stiffness against a back-and-forth input (a longitudinal direction on paper in FIG. 2) from a road surface to a tread surface may not be able to be improved.

In addition, almost 90 degrees is a skew angle ($\beta$) of intermediate cords 11a composing the intermediate carcass layer 11 to the tire circumferential direction. Further, the number of cords per unit width of the intermediate cords 11a is smaller than that of the first cords 5a and than that of the second cords 7a.

According to the above-mentioned tire 1 of the present embodiment, since the intermediate carcass layer 11 is provided between the first carcass layer 5 and the second carcass layer 7 (and also in the inner circumferential side of the tread 13), shear stiffness against a lateral or back-and-forth input can be improved without reducing shear stiffness (so-called shear strength) against a lateral input from a road surface to a tread surface. Therefore, driveability and stability, especially handling response, can be improved.

In heavy-weighted two-wheeled motorcycles, it is needed that appropriate shear stiffness against an applied load is ensured at a longitudinal or back-and-forth input. Therefore, driveability and stability, and handling response can be improved by improving shear stiffness against longitudinal and back-and-forth inputs with the intermediate carcass layer 11.

Especially, shear stiffness against longitudinal and back-and-forth inputs can be further improved by setting the skew angle ($\alpha$) of the first cords 5a and the second cords 7a to the tire circumferential direction within 70 to 85 degrees and also setting the skew angle ($\beta$) of intermediate cords 11a to the tire circumferential direction to almost 90 degrees. As a result, driveability and stability, and handling response can be further improved.

In addition, inhibition of force applying from a road surface to a tread surface is prevented by making thickness (Ta) of the intermediate carcass layer 11 smaller than thickness (T1) of the first carcass layer 5 and than thickness (T2) of the second carcass layer 7 and also making the number of cords per unit width of the intermediate cords 11a smaller than that of the first cords 5a and than that of the second cords 7a, and thereby driveability and stability, and handling response can be improved.

As described above, although contents of the present invention have been disclosed through the embodiments of the present invention, it should not be considered that descriptions and the drawings composing a portion of the disclosure limits the present invention.

Specifically, the above-described tire 1 includes a single belt layer 9. However, the tire according to the present invention is not limited to this configuration and may include plural belt layers.

In addition, the first carcass layer 5 and the second carcass layer 7 are folded back from insides toward outsides in the tread width direction along the circumferential surfaces of the bead cores 3a, respectively, in the above-explained tire 1. However, they are not limited to this configuration and the first carcass layer and the second carcass layer can be folded back from outsides toward insides in the tread width direction along the circumferential surfaces of the bead cores, respectively.

Note that it has been explained in the above description that the second carcass layer 7, the intermediate carcass layer 11 and the first carcass layer 5 are provided in order from the tire inner circumferential side to the outer circumferential side. However, it can be expressed that the first carcass layer, the intermediate carcass layer and the second carcass layer are provided in order from the tire inner circumferential side to the outer circumferential side.

Based on the disclosure, various alternative embodiments, modes of the invention and operable technologies may be obvious to the person having ordinary skill in the art. Therefore, a technical scope of the present invention is defined only by a subject matter sought to be patented in claims appropriately derived from the above explanation.

Test results with tires for two-wheeled motorcycles of a sample 1 to which the present invention was applied and comparative samples 1 and 2 will be explained in order to clarify advantages of the present invention. The present invention does not suffer any limitations by these samples. Note that each size of the tires for two-wheeled motorcycles was 120/70ZR17M/C.

Figure 3:
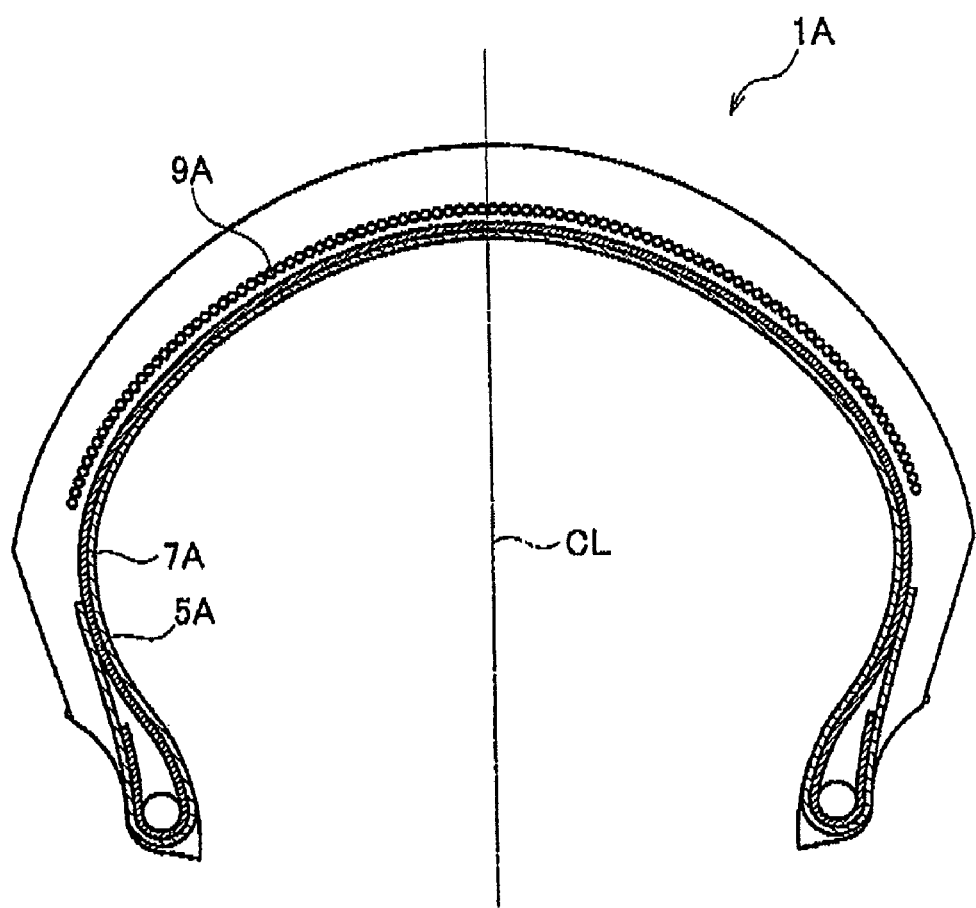
FIG. 3 is a cross sectional diagram along a tread width direction showing a tire for two-wheeled motorcycles according to a comparative sample 1.

Here, the tire 1 of the sample 1 is the above described one shown in FIG. 1. In addition, a tire 1A of the comparative sample 1 includes a first carcass layer 5A, a second carcass layer 7A and a belt layer 9A as shown in FIG. 3. The tire 1A of the comparative sample 1 does not include a supplemental layer such as the intermediate carcass layer 11.

Figure 4:
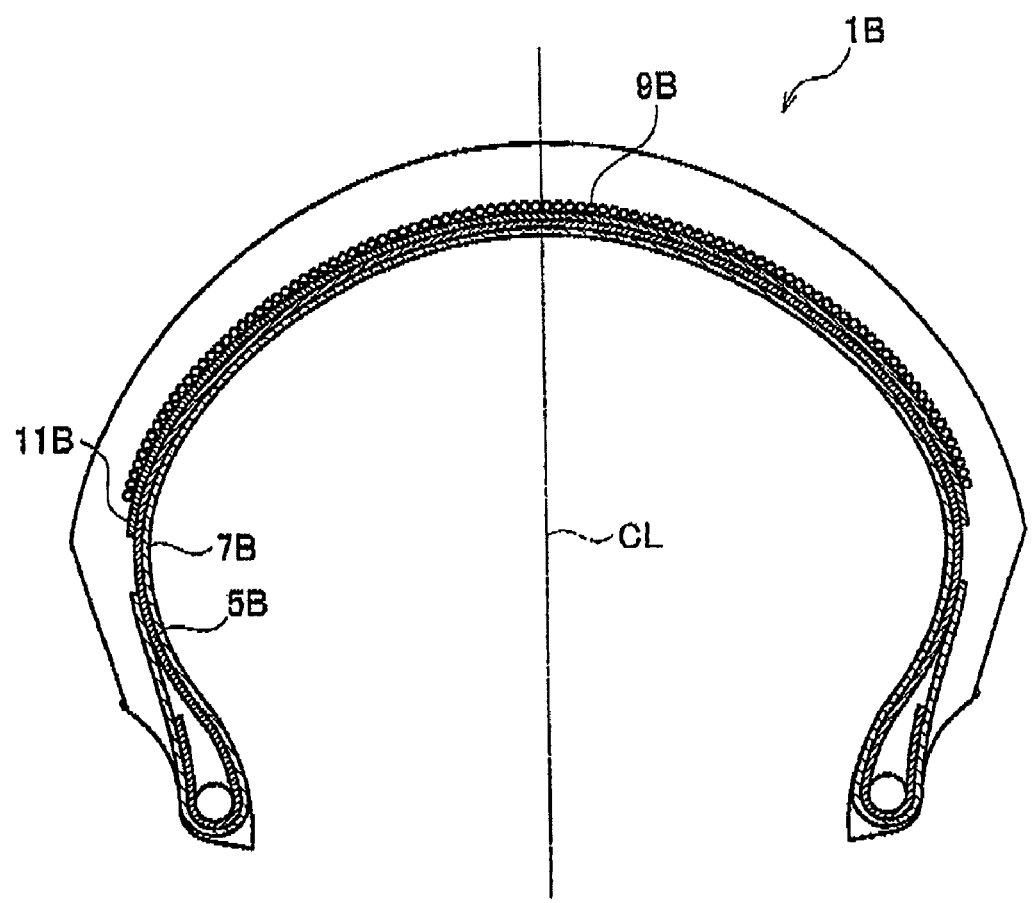
FIG. 4 is a cross sectional diagram along a tread width direction showing a tire for two-wheeled motorcycles according to a comparative sample 2.

A tire 1B of the comparative sample 2 includes a first carcass layer 5B, a second carcass layer 7B and a belt layer 9B as shown in FIG. 4. In the tire 1S of the comparative sample 2, a supplemental layer 11B is provided between the first carcass layer 5B and the belt layer 9B.

Note that, in each of the tires for two-wheeled motorcycles, the first carcass layer and the second carcass layer are made of rayon 1840 dtex. The skew angles (opposite each other) of the first carcass layer and the second carcass layer to the tire circumferential direction are 75 degrees, respectively. In addition, the belt layer is wound spirally along the tire circumferential direction. A skew angle of the belt layer to the tire circumferential direction is zero degree. Furthermore, the intermediate carcass layer and the belt layer are made of rayon 940 dtex. Each skew angle of the intermediate carcass layer and the belt layer to the tire circumferential direction is 90 degrees.

Shear stiffness (in lateral and longitudinal directions and a back-and-forth direction) and handling response of these tires for two-wheeled vehicles will be explained with reference to Table 1.

TABLE 1

| | | Sample 1 | Comparative Sample 1 | Comparative Sample 2 |
|---|---|---|---|---|
| Shear Stiffness | Longitudinal Dir. | 100 | 90 | 100 |
| | Lateral Dir. | 100 | 80 | 100 |
| | Back-and-Forth Dir. | 100 | 90 | 100 |
| Handling Response | | 100 | 70 | 75 |

<Shear Stiffness (Lateral and Longitudinal Directions and Back-and-Forth Direction>

Defined as "100" is shear stiffness against an input in a lateral or longitudinal direction or a back-and-forth direction in respect to the tire for two-wheeled motorcycles of the sample 1, the tires for two-wheeled motorcycles of the comparative samples 1 and 2 was relatively evaluated. The larger value is indicated, the better shear stiffness is.

Consequently, shear stiffness of the tire for two-wheeled motorcycles of the sample 1 is superior to that of the tire for two-wheeled motorcycles of the comparative sample 1. In addition, shear stiffness of the tire for two-wheeled motorcycles of the sample 1 is equivalent to that of the tire for two-wheeled motorcycles of the comparative sample 2.

<Handling Response>

Defined as "100" is a handling response in respect to a two-wheeled motorcycle (1800 cc) equipped with the tire of the sample 1, a sensory evaluation for handling response was conducted by a professional driver on a test course with respect to each two-wheeled motorcycle equipped with the tires of the comparative samples 1 and 2. The larger value is indicated, the better handling response is.

Consequently, handling response (i.e. driveability and stability) of the two-wheeled motorcycle equipped with the tire of the sample 1 is superior to those of the two-wheeled motorcycles equipped with the tires of the comparative samples 1 and 2.

<Combined Results>

In this manner, since the tire for two-wheeled motorcycles of the sample 1 includes the intermediate carcass layer 11 between the first carcass layer 5 and the second carcass layer, restrained is reduction of shear stiffness against inputs in lateral and longitudinal directions and in a back-and-forth direction and thereby driveability and stability, and handling response can be improved.

INDUSTRIAL APPLICABILITY

According to the tire for two-wheeled motorcycles of the present invention, reduction of shear stiffness is restrained by providing the intermediate carcass layer between the first and second carcass layers and in the inner circumferential side of the belt layer and thereby driveability and stability, especially handling response, can be improved.

The invention claimed is:

1. A pneumatic two-wheeled motorcycle tire, comprising:
   a first carcass cord layer folded back along circumferential surfaces of bead cores;
   a second carcass cord layer folded back along circumferential surfaces of turnbacks of the first carcass cord layer;
   a belt layer provided in an outer circumferential side of the first carcass cord layer and the second carcass cord layer and spirally wound along a tire circumferential direction, the belt layer extending from the tire equatorial plane to terminate at a pair of belt layer edge positions;
   a tread provided in an outer circumferential side of the belt layer, the tread extending between a pair of tread edges located at tire maximum width points FW;
   an intermediate carcass cord layer provided between the first carcass cord layer and the second carcass cord layer and in an inner circumferential side of the tread and extending from the tire equatorial plane to terminate at a pair of intermediate carcass cord layer edge positions; wherein
   each edge position of the belt layer is located at a radial distance from the rotation axis of the tire which is greater than the radial distance from the rotation axis of the tire of a line parallel to the rotation axis of the tire and passing through the tire maximum width points FW; and
   each edge position of the intermediate carcass cord layer is located at a radial distance from the rotation axis of the tire which is less by as much as 20 mm than the radial distance from the rotation axis of the tire of a line parallel to the rotation axis of the tire and passing through the tire maximum width points FW.

2. The pneumatic two-wheeled motorcycle tire according to claim 1, wherein each skew angle of the first cords composing the first carcass cord layer and the second cords composing the second carcass cord layer is 70 to 85 degrees to the tire circumferential direction.

3. The pneumatic two-wheeled motorcycle tire according to claim 2, wherein the skew angle of the first cords and the skew angle of the second cords are opposite.

4. The pneumatic two-wheeled motorcycle tire according to claim 1, wherein a skew angle of the intermediate cords composing the intermediate carcass cord layer is almost 90 degrees to the tire circumferential direction.

5. The pneumatic two-wheeled motorcycle tire according to claim 4, wherein the number of cords per unit width of the intermediate cords is smaller than the number of cords per unit width of the first cords and than the number of cords per unit width of the second cords.

6. The pneumatic two-wheeled motorcycle tire according to claim 1, wherein thickness of the intermediate carcass cord layer is smaller than thickness of the first carcass cord layer and than thickness of the second carcass cord layer.

* * * * *